United States Patent

Stahlecker

[11] Patent Number: 5,802,827
[45] Date of Patent: Sep. 8, 1998

[54] SPINDLE FOR A SPINNING OR A TWISTING MACHINE

[75] Inventor: Gerd Stahlecker, Eislingen/Fils, Germany

[73] Assignees: Fritz Stahlecker, Bad Uberkingen; Hans Stahlecker, Suessen, both of Germany

[21] Appl. No.: 829,902

[22] Filed: Mar. 25, 1997

[30] Foreign Application Priority Data

Mar. 27, 1996 [DE] Germany .................. 196 12 121.3

[51] Int. Cl.[6] .................................................. D01H 7/14
[52] U.S. Cl. ........................ 57/135; 57/132; 384/230; 384/234
[58] Field of Search ................... 57/104, 135, 132; 384/227, 230, 234

[56] References Cited

U.S. PATENT DOCUMENTS

| | | | |
|---|---|---|---|
| 2,387,260 | 10/1945 | Hargreaves et al. | 57/135 |
| 3,447,305 | 6/1969 | Stahlecker et al. | 57/135 |
| 3,798,888 | 3/1974 | Mandl | 57/135 |
| 5,359,842 | 11/1994 | Braxmeier et al. | 57/135 |
| 5,528,892 | 6/1996 | Pesek et al. | 57/135 |

FOREIGN PATENT DOCUMENTS

| | | | |
|---|---|---|---|
| 558023 | 6/1957 | Belgium | 57/135 |
| 1142017 | 9/1957 | France | 57/135 |
| 1361823 | 4/1964 | France | 57/135 |
| 574131 | 11/1931 | Germany | 57/135 |
| 1073362 | 1/1960 | Germany | 57/135 |
| 4409281A1 | 9/1995 | Germany . | |
| 980037 | 1/1965 | United Kingdom | 57/135 |

*Primary Examiner*—William Stryjewski
*Attorney, Agent, or Firm*—Evenson McKeown Edwards & Lenahan PLLC

[57] ABSTRACT

A spindle for a spinning or twisting machine comprises a guiding tube, which supports a neck bearing and a step bearing for a rotatably supported shaft. In proximity to the neck bearing, the guiding tube is supported by means of a metal membrane in a bearing housing, which is connectable to a spindle rail. The membrane is relatively rigid in radial direction; however, with respect to tilting motions of the guiding tube, it is very flexible. In the area of the step bearing, the guiding tube is supported against the bearing housing by means of a radial spring.

32 Claims, 3 Drawing Sheets

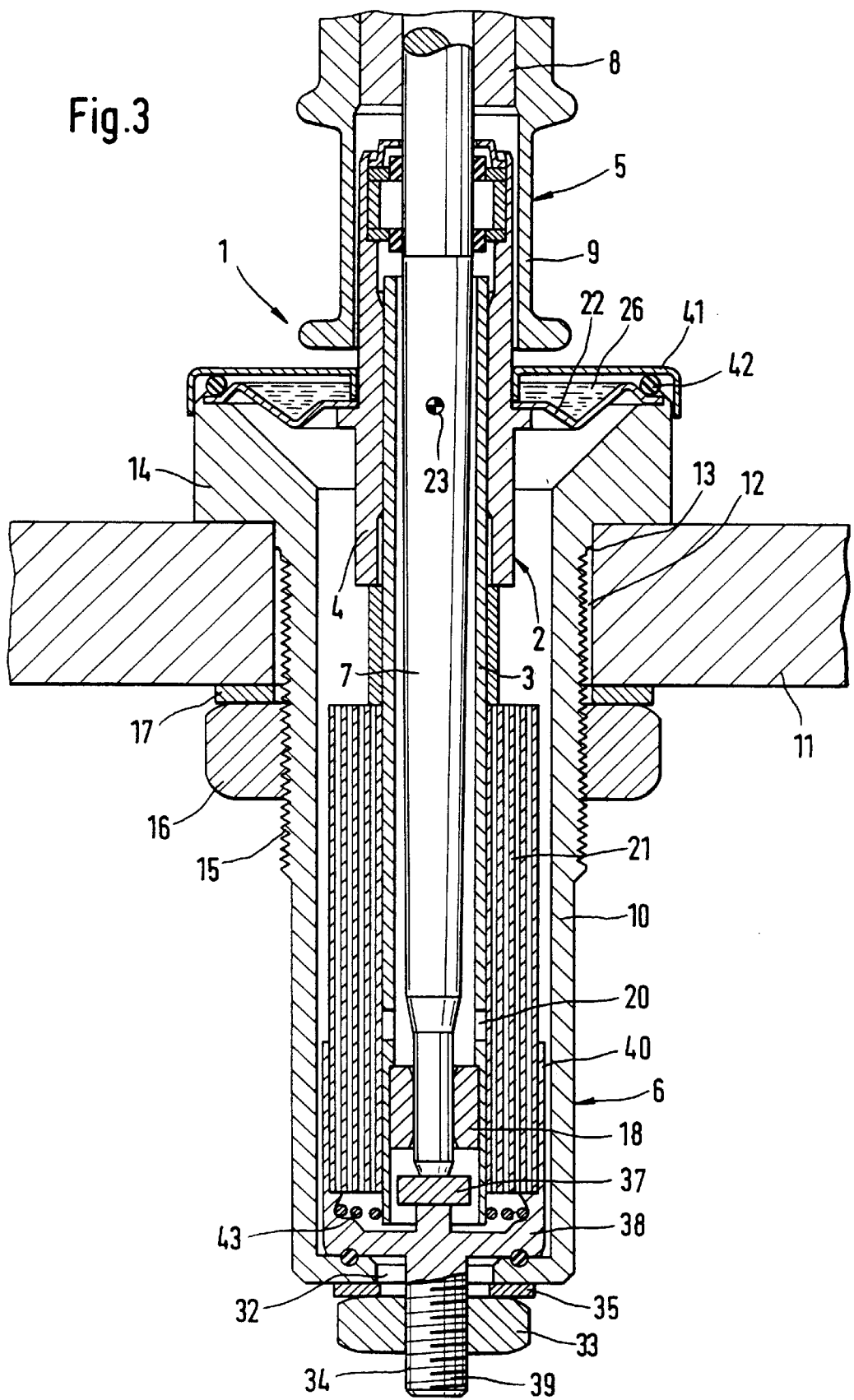

SPINDLE FOR A SPINNING OR A TWISTING MACHINE

BACKGROUND AND SUMMARY OF THE INVENTION

This application claims the priority of German application 196 12 121.3 filed in Germany on Mar. 27, 1996, the disclosure of which is expressly incorporated by reference herein.

The present invention relates to a spindle for spinning or twisting machines, said spindle comprising a guiding tube which supports a neck bearing and a step bearing for a rotatably supported shaft, and which guiding tube is mounted by means of a metal membrane, which is relatively rigid in radial direction, in proximity to the neck bearing in a bearing housing connectable to a spindle rail, which membrane forms a type of hinge for the guiding tube.

In the case of a spindle of this type (German published patent application 44 09 281), the spring tension of the entire membrane is so rigid that its tilt rigidity corresponds to a desired radial rigidity of the step bearing. The membrane is thus capable of guiding the guide tube back to its zero position when operational wandering movements occur.

It is an object of the present invention to further improve the vibratory behavior of the above mentioned spindle and in particular to achieve an effective noise damping.

This object has been achieved in accordance with the present invention in that the membrane is very flexible with respect to the tilting movements of the guiding tube and that the guiding tube is supported against the bearing housing in the area of the step bearing by means of a radial spring.

Due to the very low tilt rigidity, the membrane effects first and foremost an excellent noise damping, as the membrane acts as a discontinuity point for structure-borne noise which emanates from the neck bearing, and which, due to the membrane, cannot radiate entirely to the spindle rail. Radial rigidity of the membrane in combination with extreme flexibility against tilting movements results therein that the hinge, during tilting movements of the spindle, is disposed on the line of intersection between the membrane and the spindle axis. The point around which the guiding tube moves is therefore approximately defined. As, due to its flexibility with respect to tilting movements, the membrane is not capable of executing return movements of the guiding tube during displacement caused by operating conditions, an additional radial spring is provided in the area of the step bearing, with which radial spring the spindle axis can be centrically and vertically aligned.

The return motion forces are then particularly strong when the radial spring is arranged underneath the step bearing. To this end, the radial spring is formed as a spiral spring, which can either be wound from round wire or punched out of a curved spring washer.

The membrane is—in axial section—advantageously wave-like. A shape of this type is particularly favorable for the desired flexible tilting movements. The membrane can be made of a thin spring material measuring approximately 0.1 mm. Thus no excessively high tensions arise, and therefore no difficulties with stability.

In an embodiment of the present invention, the radial spring can be supported by a pot-like component, which is radially adjustable in relation to the bearing housing. Thus with simple means the spindle can be vertically aligned. It is hereby purposeful when the pot-like component is a receiver for a damping spiral. When the radial spring and the damping spiral can be taken up in the same adjusting element, the coils of the damping spiral cannot be pressed together when the spindle is adjusted.

In a further embodiment, the membrane can be provided above the bearing housing with a cover, whereby the space between the membrane and the cover can be filled by a damping material. This increases the effect of the damping spiral with respect to noise reduction.

These and further objects, features and advantages of the present invention will become more readily apparent from the following detailed description thereof when taken in conjunction with the accompanying drawings.

BRIEF DESCRIPTION OF THE DRAWINGS

FIG. 3 is an axial sectional view of a spindle constructed according to a third preferred embodiment of the invention, in which a thrust pad of the step bearing is supported on the bottom of the bearing housing.

DETAILED DESCRIPTION OF THE DRAWINGS

Figure 1:
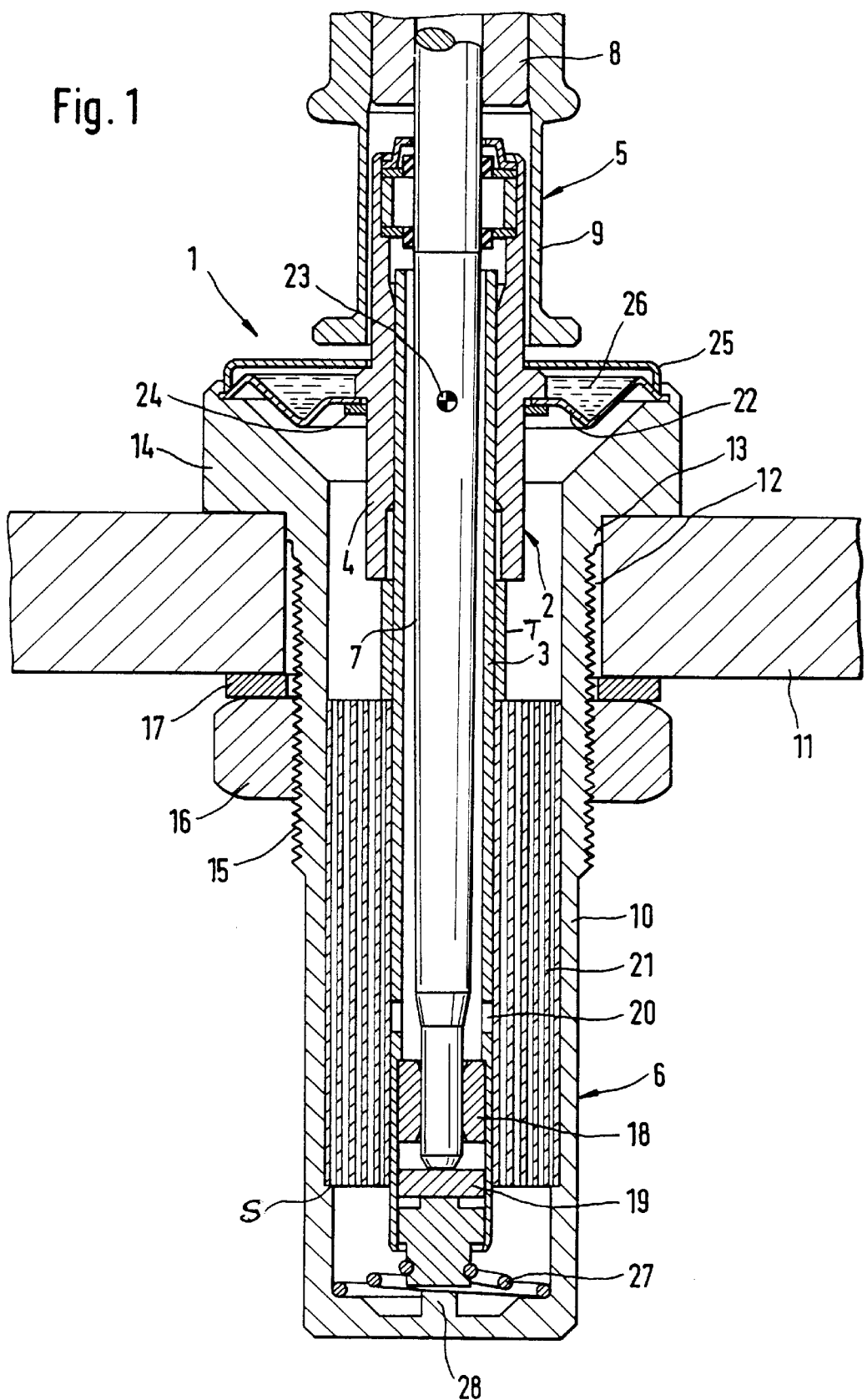
FIG. 1 is an axial sectional view of a spindle constructed according to a first preferred embodiment of the present invention.

A spindle denoted by 1 in FIG. 1 comprises a rigid guiding tube 2, which is made of two parts and consists of a lower sleeve tube 3 as well as an upper tube-like bearing head 4 pressed onto the sleeve tube 3.

A neck bearing 5 in the form of a roller bearing is taken up by the relatively rigid bearing head 4 of the guiding tube 2. The two-part step bearing 6, described below, is supported in the sleeve tube 3 of the guiding tube 2.

The shaft 7 of the spindle 1 is rotatably supported in the neck bearing 5 and the step bearing 6. Above the neck bearing 5 of the vertically arranged spindle 1 is located an upper part 8, which in the usual way takes up a tube for the bobbin. The shaft 7 is connected to a drive wharve 9 above the neck bearing 5, which drive wharve 9 is driven by a drive belt (not shown). The arrangement of the parts is such that the transverse force of the drive belt can be taken up directly by the neck bearing 5.

The relatively rigid guiding tube 2 is housed in a tube-shaped bearing housing 10, which itself can be affixed directly to a spindle rail 11 without the use of any elastomer elements. The spindle rail 11 has to this end a through bore hole 12, through which the bearing housing 10 can be placed from above. The bearing housing 10 is provided in its upper area with a centering collar 13 with close tolerances, so that it fits into the bore hole 12 with extremely narrow clearance. The bearing housing 10 is supported from above by a radial flange 14 on the spindle rail 11. Downwards, adjoining the flange 14, the bearing housing 10 is provided with an outer thread 15 which can take up a fastening nut 16. By means of the application of a washer 17, the fastening nut 16 fixes the bearing housing 10 to the spindle rail 11.

The step bearing 6 comprises a step bearing tube 18, which is pressed into the lower area of the sleeve tube 3 of the guiding tube 2 and which takes up the radial forces.

Figure 2:
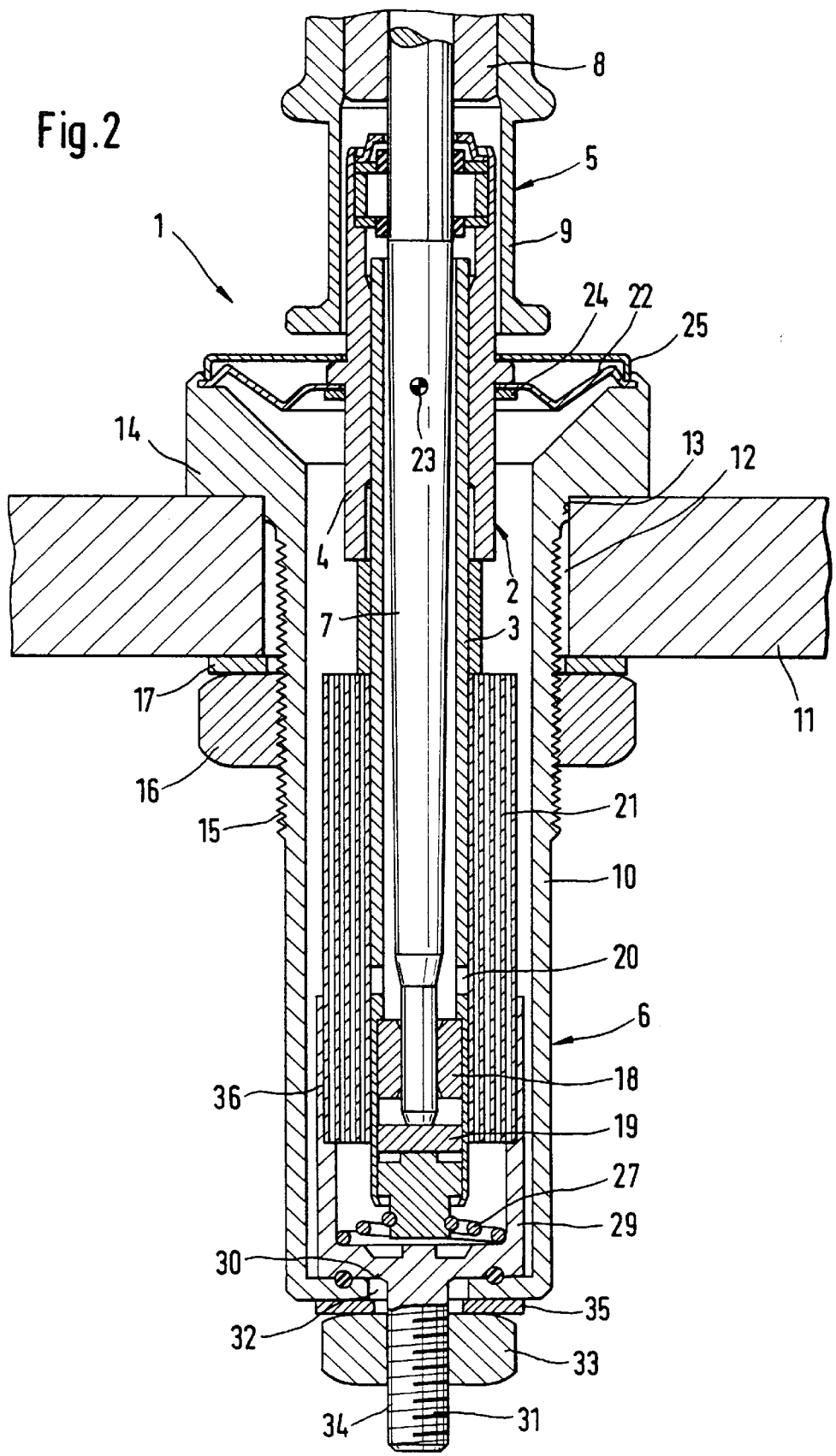
FIG. 2 is an axial sectional view of a spindle constructed according to a second preferred embodiment of the invention, in which the radial spring is taken up by a pot-like component which is radially adjustable in relation to the bearing housing.

As described up to now, the embodiments of the FIGS. 1 to 3 are identical to one another, and therefore the same reference numbers are used. A repeat description of the components described up to this point can therefore be dispensed with for FIGS. 2 and 3.

With respect to the following further descriptions of FIG. 1, not all variations are now identical to one another.

FIG. 1 comprises a thrust pad 19 for the shaft 7 which thrust pad 19 takes up the axial forces. The thrust pad 19 is supported in this embodiment in the sleeve tube 3. This is known as a so-called hanging arrangement.

The step bearing tube 18 is provided with axially extending oil grooves (not shown) in order that the lubricating oil can be distributed above and below the step bearing 6. The sleeve tube 3 comprises just above the step bearing tube 18 a plurality of cross bore holes 20, so that the lubricating oil can also penetrate into the ring space outside of the sleeve tube 3. In this area, that is between the inner wall of the bearing housing 10 and the outer circumference of the sleeve tube 3, a damping spiral 21 in the form of an oil spiral is provided, which is supported against the bearing head 4 by a spacing tube T. The damping spiral 21 is supported downwards on a step S of the bearing housing 10.

In the area of the neck bearing 5, in this case between the drive wharve 9 and the flange 14 of the bearing housing 10, the guiding tube 2 is supported by a membrane 22 against the bearing housing 10. The wave-shaped—in axial section—membrane 22 is relatively rigid in radial direction, but is however very flexible with respect to tilting movements. Thus a kind of hinge arises for the guiding tube 2, which is symbolically denoted by a circle with the reference 23, and which is disposed on the line of intersection between the membrane 22 and the axis of the spindle 1.

The membrane 22 consists of a very thin spring material of approximately 0.1 mm thick, so that it is not possible to exert a sufficient return motion force on the guiding tube 2 during operationally induced displacement.

The membrane 22 is clamped at the bearing head 4 by means of a clamping ring 24 and formed to connect to the clamping ring 24 outside in the area of the flange 14 of the bearing housing 10.

The membrane 22 is covered by a cover 25 from above. The space between the membrane 22 and the cover 25 can be filled with a damping means 26, for example with a lubricator, for increased noise damping.

In order that the guiding tube 2 can be guided back to its zero position when operationally-induced displacement occurs, the radial spring tension of the step bearing 6 is achieved by means of a radial spring 27, which is arranged underneath the step bearing 6. The radial spring 27 is in the form of a spiral-shaped spring and is either wound from round wire or punched out of a spring disc. With the aid of the radial spring 27, a centrical and vertical alignment of the axis of the spindle 1 is ensured.

Underneath the area of the thrust pad 19, there is a safety stop 28 on the bottom of the bearing housing 10, which safety stop 28 comes into operation in the case of extreme axial forces.

The spindle 1 in FIG. 2 corresponds to a large extent to the embodiment according to FIG. 1, including the arrangement of the membrane 22. There is, however, one feature in the area of the bottom of the bearing housing 10 which feature differs from that in FIG. 1.

The spindle 1 in FIG. 2 comprises a pot-like component 29 in the area of the step bearing 6, which pot-like component 29 is arranged inside the bearing housing 10 and which in relation thereto is radially movable. With the aid of this pot-like component 29, the spindle 1 can be easily aligned vertically.

At the bottom 30 of the pot-like component 29, a bolt 31 is applied with a ring seal (not denoted) disposed therebetween, which bolt 31 is guided through a bore hole 32 in the bottom of the bearing housing 10. The bolt 31 is provided with an outer thread 34, onto which a fastening nut 33 is screwed. The set position of the pot-like component 29 can thus be fixed as soon as the fastening nut 33 has been screwed against the washer 35.

The bolt 31 is a certain amount longer than is required to apply the fastening nut 33. It is thus possible to adjust the bolt 31 and therewith the whole guiding tube 2 in radial direction after the fastening nut 33 has been unscrewed. The spindle 1 can thus be centrically and vertically adjusted in its position. The adjusted position is then subsequently set by screwing on the fastening nut 33 again.

The pot-like component 29 comprises upwards a tube-like extension 36 which serves to take up the damping spiral 21. Thus, when the pot-like component 29 is radially adjusted, the coils of the damping spiral 21 cannot be pressed together.

The embodiment in FIG. 3 corresponds to a great extent to the variation in FIG. 2, whereby in FIG. 3, however, a thrust pad 37 is provided which is supported directly on the bottom of the bearing housing 10 and which is not mounted in the guiding tube 2 as a so-called hanging variation, as in-the embodiments described above. The embodiment in FIG. 3 is known as a standing arrangement.

The thrust pad 37 in FIG. 3 is a part of a pot-like component 38, which is disposed on the bottom of the bearing house 10 with a ring seal (not denoted) inserted therebetween, the pot-like component 38 being, in relation to the bottom of the bearing house 10, again radially adjustable. The pot-like component 38 serves to take up a radial spring 43.

Similar to FIG. 2, in the embodiment in FIG. 3 the pot-like component 38 is extended downwards by a bolt 39, which projects through a bore hole 32 in the bottom of the bearing housing 10. When the fastening nut 33 is unscrewed, the pot-like component 38 can be radially adjusted, whereby the position of the spindle 1 can be vertically aligned. The set position is subsequently fixed by screwing the fastening nut 33 back on.

The pot-like component 38 comprises again a tube-like extension 40, which takes up the damping spiral 21—again for the same reasons as above.

In the area of the neck bearing 5 a membrane 22 is again provided, which is rigid in radial direction and very flexible with regard to tilting movements, and which membrane 22 supports the guiding tube 2, in particular the bearing head 4, against the bearing housing 10. In the embodiment in FIG. 3, the membrane 22 is formed to connect with the inside of the bearing head 4 as well as outside with the flange 14 of the bearing housing 10.

The membrane 22 is covered from above by a covering 41, with a sealing ring inserted therebetween. The space between the covering 41 and the membrane 22 can again be filled with a damping means 26.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A spindle for spinning or twisting machines, said spindle comprising:

a rotatable shaft, a neck bearing and a step bearing supporting the shaft, a guiding tube supporting the neck bearing and the step bearing, and a bearing housing supportingly connected to the guiding tube in an area of the neck bearing by means of a membrane, said bearing housing being connectable to a spindle rail, wherein said membrane is relatively rigid in a radial direction and relatively resilient in an axial direction to thereby form a hinge for the guiding tube about a tilting axis at a level of the membrane which is flexible with regard to tilting movements of the guiding tube, and wherein said guiding tube is supported radially with respect to the bearing housing by a radial spring in an area of the step bearing such that said radial spring opposes tilting movements of the guiding tube about the tilting axis.

2. A spindle according to claim 1, wherein the radial spring is arranged underneath the step bearing.

3. A spindle according to claim 2, wherein the radial spring is in the form of a helical spring.

4. A spindle according to claim 2, wherein the membrane has a wave-like construction.

5. A spindle according to claim 2, wherein the membrane consists of thin spring material measuring approximately 0.1 mm thick.

6. A spindle according to claim 1, wherein the radial spring is in the form of a helical spring.

7. A spindle according to claim 6, wherein the membrane has a wave-like construction.

8. A spindle according to claim 6, wherein the membrane consists of thin spring material measuring approximately 0.1 mm thick.

9. A spindle according to claim 1, wherein the membrane has a wave-like construction.

10. A spindle according to claim 9, wherein the membrane consists of thin spring material measuring approximately 0.1 mm thick.

11. A spindle according to claim 1, wherein the membrane consists of thin spring material measuring approximately 0.1 mm thick.

12. A spindle according to claim 1, wherein the radial spring is supported at a pot-like component which is radially movable in relation to the bearing housing.

13. A spindle according to claim 12, wherein the pot-like component is a receiver for a damping spiral which surrounds a lower portion of said guiding tube.

14. A spindle according to claim 13, wherein the radial spring is arranged underneath the step bearing.

15. A spindle according to claim 14, wherein the membrane has a wave-like construction in.

16. A spindle according to claim 15, wherein the membrane consists of thin spring material measuring approximately 0.1 mm thick.

17. A spindle according to claim 12, wherein the membrane is provided above the bearing housing with a covering and the space between the membrane and the covering is filled with a damping medium.

18. A spindle according to claim 1, wherein the membrane is provided above the bearing housing with a covering, and the space between the membrane and the covering is filled with a damping medium.

19. A spindle according to claim 18, wherein the radial spring is arranged underneath the step bearing.

20. A spindle according to claim 19, wherein the radial spring is in the form of a helical spring.

21. A spindle according to claim 1, wherein the membrane is a metal membrane.

22. A spindle according to claim 21, wherein the membrane has a wave-like construction.

23. A spindle according to claim 22, wherein the membrane consists of thin spring material measuring approximately 0.1 mm thick.

24. A spindle according to claim 22, wherein the radial spring is arranged underneath the step bearing.

25. A spindle according to claim 24, wherein the radial spring is in the form of a helical spring.

26. A spindle according to claim 25, wherein the radial spring is supported at a pot-like component which is radially movable in relation to the bearing housing.

27. A spindle according to claim 26, wherein the pot-like component is a receiver for a damping spiral which surrounds a lower portion of said guiding tube.

28. A spindle according to claim 22, wherein the radial spring is in the form of a helical spring.

29. A spindle for spinning or twisting machines, said spindle comprising:

a rotatable shaft, a neck bearing and a step bearing supporting the shaft, a guiding tube supporting the neck bearing and the step bearing, and a bearing housing supportingly connected to the guiding tube in an area of the neck bearing by means of a membrane, said bearing housing being connectable to a spindle rail, wherein said membrane forms a hinge for the guiding tube which is flexible with regard to tilting movements of the guiding tube, wherein said guiding tube is supported radially with respect to the bearing housing by a radial spring in an area of the step bearing, and wherein the membrane is provided above the bearing housing with a covering, a space between the membrane and the covering being filled with a damping medium.

30. A spindle according to claim 29, wherein the radial spring is arranged underneath the step bearing.

31. A spindle according to claim 30, wherein the radial spring is in the form of a helical spring.

32. A spindle according to claim 29, wherein the membrane is a metal membrane.

* * * * *